United States Patent
Motoki et al.

(10) Patent No.: US 8,903,547 B2
(45) Date of Patent: Dec. 2, 2014

(54) WORKING DEVICE AND WORKING METHOD

(75) Inventors: Hitoe Motoki, Utsunomiya (JP); Ryo Nakajima, Tochigi-ken (JP); Masaru Maruo, Utsunomiya (JP); Mitsugu Takahashi, Yokohama (JP); Takao Shibayama, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 362 days.

(21) Appl. No.: 13/255,596

(22) PCT Filed: Mar. 11, 2010

(86) PCT No.: PCT/JP2010/054142
§ 371 (c)(1),
(2), (4) Date: Sep. 9, 2011

(87) PCT Pub. No.: WO2010/104157
PCT Pub. Date: Sep. 16, 2010

(65) Prior Publication Data
US 2011/0320038 A1    Dec. 29, 2011

(30) Foreign Application Priority Data

Mar. 11, 2009   (JP) ................. 2009-057927
Mar. 11, 2009   (JP) ................. 2009-057932

(51) Int. Cl.
   *B25J 9/00*      (2006.01)
   *B25J 19/00*      (2006.01)

(52) U.S. Cl.
   CPC .................. *B25J 19/0008* (2013.01)

USPC ..... 700/245; 700/250; 74/490.01; 74/490.05; 414/720

(58) Field of Classification Search
USPC ........ 700/245, 250; 901/2, 28, 46; 74/490.01, 74/490.05; 414/720
See application file for complete search history.

(56) References Cited

U.S. PATENT DOCUMENTS

| | | | |
|---|---|---|---|
| 4,541,770 A | 9/1985 | Niinomi et al. | |
| 5,562,012 A * | 10/1996 | Nishi et al. | 74/490.01 |
| 5,577,414 A * | 11/1996 | Ogawa et al. | 74/490.03 |
| 6,186,023 B1 * | 2/2001 | Nakamura et al. | 74/490.01 |
| 6,748,819 B2 * | 6/2004 | Maeguchi et al. | 74/490.01 |
| 6,923,613 B2 * | 8/2005 | Stuyt | 414/719 |
| 8,266,979 B2 * | 9/2012 | Yonehara et al. | 74/490.03 |
| 2006/0161382 A1 * | 7/2006 | Kaneyasu et al. | 702/168 |

(Continued)

FOREIGN PATENT DOCUMENTS

| | | |
|---|---|---|
| CN | 101234486 | 8/2008 |
| CN | 101375386 | 2/2009 |

(Continued)

OTHER PUBLICATIONS

Chinese Office Action and English Translation dated Sep. 4, 2013, Application No. 201080011305.2, 10 pages.

*Primary Examiner* — Thomas G Black
*Assistant Examiner* — Wae Louie
(74) *Attorney, Agent, or Firm* — Rankin, Hill & Clark LLP

(57) ABSTRACT

A working device and a working method wherein an articulated robot controls vertical movement of a balancer arm by commanding vertical movement for a balancer, and moves the balancer arm horizontally by applying an external force to the balancer arm in the horizontal direction by means of a robot arm.

5 Claims, 15 Drawing Sheets

(56) References Cited

U.S. PATENT DOCUMENTS

| | | | |
|---|---|---|---|
| 2010/0222918 A1 | 9/2010 | Nonaka et al. | |
| 2011/0048649 A1* | 3/2011 | Komatsu et al. | 157/1.35 |
| 2011/0320038 A1* | 12/2011 | Motoki et al. | 700/245 |
| 2012/0265345 A1* | 10/2012 | Nakahara | 700/259 |

FOREIGN PATENT DOCUMENTS

| | | |
|---|---|---|
| JP | 60-052277 | 3/1985 |
| JP | 61-109682 | 5/1986 |
| JP | 05-340107 | 12/1993 |
| JP | 07-088785 | 4/1995 |
| JP | 09-001492 | 1/1997 |
| JP | 09-0014892 | 1/1997 |
| JP | 11-198077 | 7/1999 |
| JP | 2000-210825 | 8/2000 |
| JP | 2001-139300 | 5/2001 |
| JP | 2009-262304 | 11/2009 |
| WO | 2009096239 | 8/2009 |

* cited by examiner

WORKING DEVICE AND WORKING METHOD

TECHNICAL FIELD

The present invention relates to a working apparatus (device) including an articulated robot, and more particularly to a working apparatus and a working method, which allow a balancer to cooperate with an articulated robot.

BACKGROUND ART

Assembly lines for automobiles and automobile parts automatically install automobile parts using articulated robots (see, for example, Japanese Laid-Open Patent Publication No. 2000-210825). Japanese Laid-Open Patent Publication No. 2000-210825 discloses an installation apparatus for automatically installing tires, one of heavy parts, onto automobile bodies using articulated robots. More specifically, the installation apparatus disclosed in Japanese Laid-Open Patent Publication No. 2000-210825 includes a tire installing mechanism (32) for automatically installing a tire (20) on a vehicle, the tire installing mechanism (32) having a plurality of nut runners (114a through 114d, 116) for placing as many nuts (24) as the number of hub bolts onto the vehicle at given circumferential intervals, a nut supply mechanism (22) for supplying nuts (24), one at a time, in a vertical attitude, and a nut arranging mechanism (33) for placing the nuts (24) supplied from the nut supply mechanism (22) in a circular pattern at circumferential intervals at which all of the nut runners (114a through 114d, 116) are arranged in a circular pattern, and transferring the nuts (24) to the nut runners (114a through 114d, 116) (see abstract of Japanese Laid-Open Patent Publication No. 2000-210825).

Certain assembly lines for automobiles and automobile parts employ a balancer for helping the worker in moving heavy parts (see, for example, Japanese Laid-Open Patent Publication No. 2001-139300). The balancer disclosed in Japanese Laid-Open Patent Publication No. 2001-139300 produces an upward force depending on the weight of a load (2) when the load (2) is suspended on a hook (16). The worker can move the cargo (2) horizontally through an arm (1) by applying a horizontal external force. The worker can also move the cargo (2) vertically through the arm (1) by operating an operating lever (17) (see, for example, paragraphs [0006] through [0008] and FIG. 1 of Japanese Laid-Open Patent Publication No. 2001-139300).

SUMMARY OF THE INVENTION

With the installing apparatus disclosed in Japanese Laid-Open Patent Publication No. 2000-210825, a tire gripping means (110) for gripping the tire (20), and the nut runners (114a through 114d, 116) for fastening the tire (20) onto the vehicle are mounted on a single robot (10).

There have recently been demands for smaller and simpler overall equipment for use as tire installing apparatus as well as various other apparatus.

The present invention has been made in an effort to meet the above demands. It is an object of the present invention to provide a working apparatus and a working method, which are capable of efficiently performing a desired working process with a simple and compact arrangement.

A working apparatus according to the present invention includes a balancer and an articulated robot. The balancer supports a workpiece or an external device with a balancer arm, maintains the balancer arm at a constant height with an output depending on the weight of the workpiece or the external device, horizontally moves the balancer arm depending on a horizontal external force applied to the balancer arm, and is vertically movable in response to an external command. The robot instructs the balancer to move vertically so as to control vertical movement of the balancer arm, and applies a horizontal external force to the balancer arm through a robot arm so as to move the balancer arm horizontally.

According to the present invention, the robot arm can control displacement of the balancer arm. Since an operation sequence of the robot arm can thus be assisted by the balancer arm, the articulated robot can be reduced in size and simplified in structure. Consequently, a desired operational sequence can be carried out efficiently by a simple and compact arrangement.

The balancer may include a vertical movement switch for externally controlling vertical movement of the balancer arm, and the robot may operate the vertical movement switch through the robot arm so as to control vertical movement of the balancer arm.

The robot may have a maximum power or maximum rated output (the maximum one of the rated outputs of drive sources of actuators) of 80 W or smaller. The articulated robot can thus meet standards (ISO-10218-1: Safety Requirements for Industrial Robots) of the International Organization for Standardization (ISO), or standards (JIS B8433-1: Industrial Robots—Safety Requirements—Part 1: Robots) according to the Japan Industrial Standards (JIS). In addition, the robot is exempt from occupational safety and health regulations.

The working apparatus may further comprise a joint that joins the balancer arm and the robot arm to each other, wherein the joint joins the robot arm detachably to the balancer arm. If necessary, the robot arm may be separated from the balancer arm, and the balancer arm may be applied to a different mode of use (e.g., to assist an operation sequence carried out by the operator).

The working apparatus may further comprise a drive device for applying a vertical drive force to the balancer arm, and a controller for controlling the drive device. The controller controls the drive device to maintain the balancer arm at a constant height with an output depending on the weight of the workpiece or the external device, and the weight of the robot arm, and further controls the drive device to lift the balancer arm depending on ascent of the robot arm, and to lower the balancer arm depending on descent of the robot arm. Since the weight of the robot arm is borne by the balancer arm, the robot arm is not required to bear its own vertical weight, and hence the output of the robot arm can be reduced. Therefore, since the output of the robot arm can be reduced, as a result, the robot can be used in an environment including operators.

The drive device may include at least one of a motor and an air cylinder.

A working apparatus according to the present invention comprises a balancer, an articulated robot, and a joint that physically joins a balancer arm of the balancer and a robot arm of the robot. The balancer supports a workpiece or an external device with the balancer arm, maintains the balancer arm at a constant height with an output depending on the weight of the workpiece or the external device, horizontally moves the balancer arm depending on a horizontal external force applied to the balancer arm, and has a vertical movement switch for externally controlling vertical movement of the balancer arm. The robot operates the vertical movement switch through the robot arm so as to control vertical movement of the balancer arm, and applies a horizontal external force to the balancer arm through the robot arm and the joint so as to move the balancer arm horizontally.

According to the present invention, the robot arm can control displacement of the balancer arm. Since an operation sequence of the robot arm can thus be assisted by the balancer arm, the articulated robot can be reduced in size and simplified in structure. Consequently, a desired operational sequence can be carried out efficiently by a simple and compact arrangement.

The vertical movement switch of the balancer may include a rotary lever rotatable within a given angular range in a hypothetical vertical plane, and a potentiometer for detecting angular displacement of the rotary lever. When the rotary lever is horizontal, vertical movement of the balancer arm is stopped, when the rotary lever is displaced upwardly, the balancer arm is lifted, and when the rotary lever is displaced downwardly, the balancer arm is lowered. The joint may include a linear guide extending vertically and fixed to the balancer arm, and a slider movable reciprocally on the linear guide and fixed to the robot arm. When the rotary lever is horizontal, the rotary lever has a distal end held in engagement with the slider, and the robot causes the slider to displace the rotary lever, so as to control vertical movement of the balancer.

Therefore, the balancer arm and the robot arm are joined to each other by a simple structure. Certain commercially available balancers include an operation switch employing a rotary lever and a potentiometer. The above joint makes it possible to construct the workpiece feed apparatus according to the present embodiment, while using a commercially available balancer and a commercially available articulated robot. Inasmuch as the balancer arm is lifted when the rotary lever is displaced upwardly, and since the balancer arm is lowered when the rotary lever is displaced downwardly, the robot arm and the slider can move vertically before the balancer arm is displaced, and hence the robot arm and the slider operate efficiently.

The slider may have a cam groove defined therein, which engages the distal end of the rotary lever. When the rotary lever is in a position for stopping vertical movement of the balancer arm, the distal end of the rotary lever enters into the cam groove, and when the rotary lever is in a position for lifting or lowering the balancer arm, the distal end of the rotary lever moves out of the cam groove. The position of the rotary lever can thus be stably maintained for stopping the balancer arm.

The joint may include a position sensor for detecting the position of the slider, the position sensor being disposed in at least one of an upper-limit position and a lower-limit position of the slider. The position sensor makes it possible to prevent the slider from moving too far away from the rotary lever, so that the robot arm can be displaced following the balancer arm.

The joint may include a detachable member by which the robot arm is detachably joined to the balancer arm. If necessary, the robot arm may be separated from the balancer arm, whereby the balancer arm can be applied to a different mode of operation (e.g., to assist an operation sequence carried out by the operator).

According to the present invention, there is also provided a working method using a working apparatus, which includes a balancer supporting a workpiece or an external device with a balancer arm, and an articulated robot having a robot arm, the working method comprising the steps of instructing the balancer from the robot to move vertically, so as to vertically move the balancer arm while the workpiece or the external device is supported by the balancer arm, and applying a horizontal external force from the robot arm to the balancer arm, so as to move the balancer arm horizontally while the workpiece or the external device is supported by the balancer arm, wherein the robot has a maximum power or maximum rated output of 80 W or smaller.

According to the present invention, there is further provided a working method using a working apparatus, which includes a balancer supporting a workpiece or an external device with a balancer arm, and an articulated robot having a robot arm which is joined to the balancer arm by a joint, the working method comprising the steps of operating a vertical movement switch of the balancer with the robot arm, so as to vertically move the balancer arm while the workpiece or the external device is supported by the balancer arm, and applying a horizontal external force from the robot arm to the balancer arm through the joint, so as to move the balancer arm horizontally while the workpiece or the external device is supported by the balancer arm.

DESCRIPTION OF THE EMBODIMENTS

A. First Embodiment

[Arrangement of First Embodiment]

Figure 1:
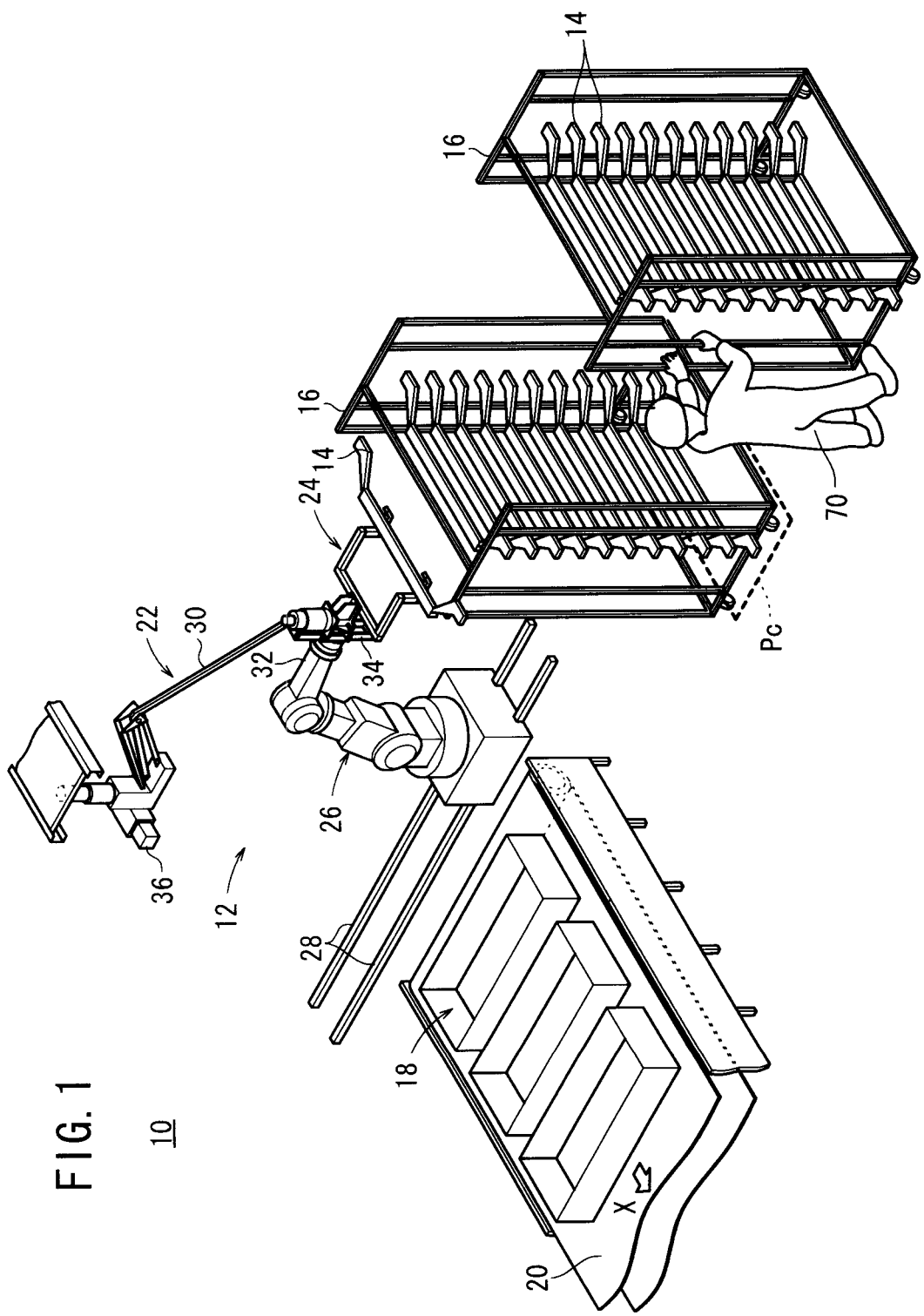
FIG. 1 is a perspective view of an assembly line incorporating a workpiece feed apparatus as a working apparatus according to a first embodiment of the present invention.
Figure 2:
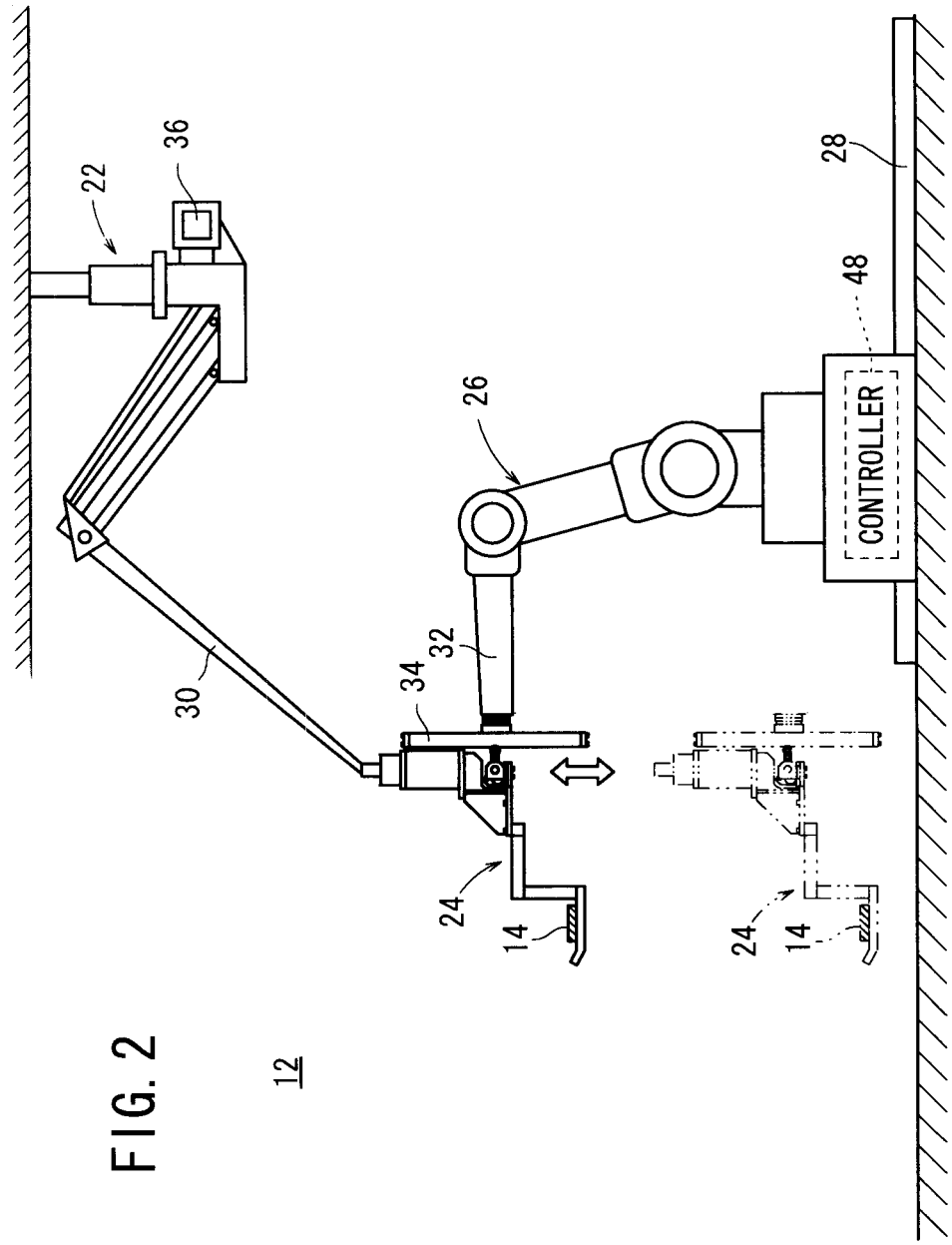
FIG. 2 is a side elevational view of the workpiece feed apparatus, which holds a workpiece, according to the first embodiment.

FIG. 1 is a perspective view of an assembly line 10 incorporating a workpiece feed apparatus 12 as a working apparatus according to a first embodiment of the present invention. FIG. 2 is a side elevational view of the workpiece feed apparatus 12, which holds a workpiece 14.

On the assembly line 10, a carriage 16 holds a plurality of workpieces 14, e.g., suspension parts. A workpiece 14 is taken from the carriage 16 and is transferred onto a pallet jig 18 on a conveyor 20. The conveyor 20 feeds the pallet jig 18 with the workpiece 14 placed thereon in the direction indicated by the arrow X in FIG. 1.

The workpiece feed apparatus 12 includes a balancer 22, which is suspended from the ceiling, a hand jig 24 mounted on a distal end of the balancer 22, and an articulated robot 26. The robot 26 is disposed on slide rails 28 to enable movement of the robot 26 when necessary. The balancer 22 includes a balancer arm 30 and the robot 26 includes a robot arm 32. The balancer arm 30 and the robot arm 32 are joined to each other by a joint 34.

The balancer 22 has a motor 36 (drive device), which generates a vertically upward force depending on a load applied to the balancer arm 30, so as to maintain the workpiece 14, which is supported on the hand jig 24 mounted on the distal end of the balancer arm 30, in midair, i.e., to maintain the workpiece 14 at a constant height. The balancer 22 can horizontally move the hand jig 24 together with the workpiece 14 supported thereon depending on a horizontal external force applied to the balancer arm 30. The balancer 22 also is capable of moving the balancer arm 30 vertically, by a process to be described later.

According to the first embodiment, an air cylinder may be used instead of the motor 36, or a combination of the motor 36 and an air cylinder, e.g., the combination disclosed in Japanese Laid-Open Patent Publication No. 2001-139300, may be used.

Figure 3:
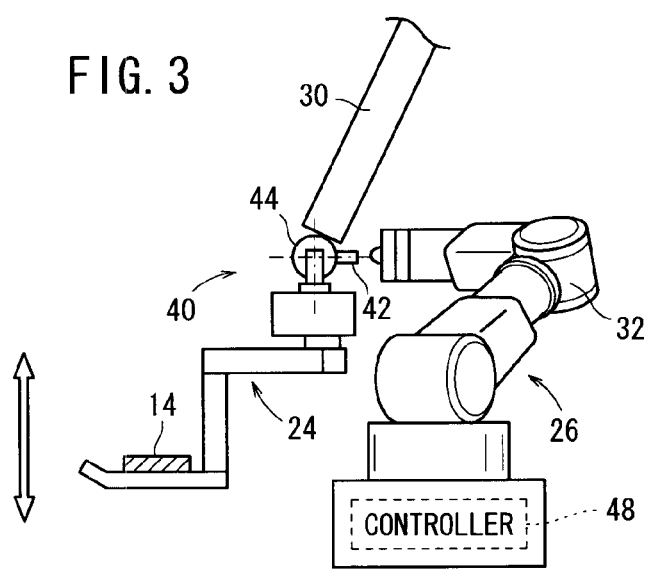
FIG. 3 is a side elevational view showing a manner in which a balancer arm and a robot arm of the workpiece feed apparatus are joined to each other.
Figure 4:
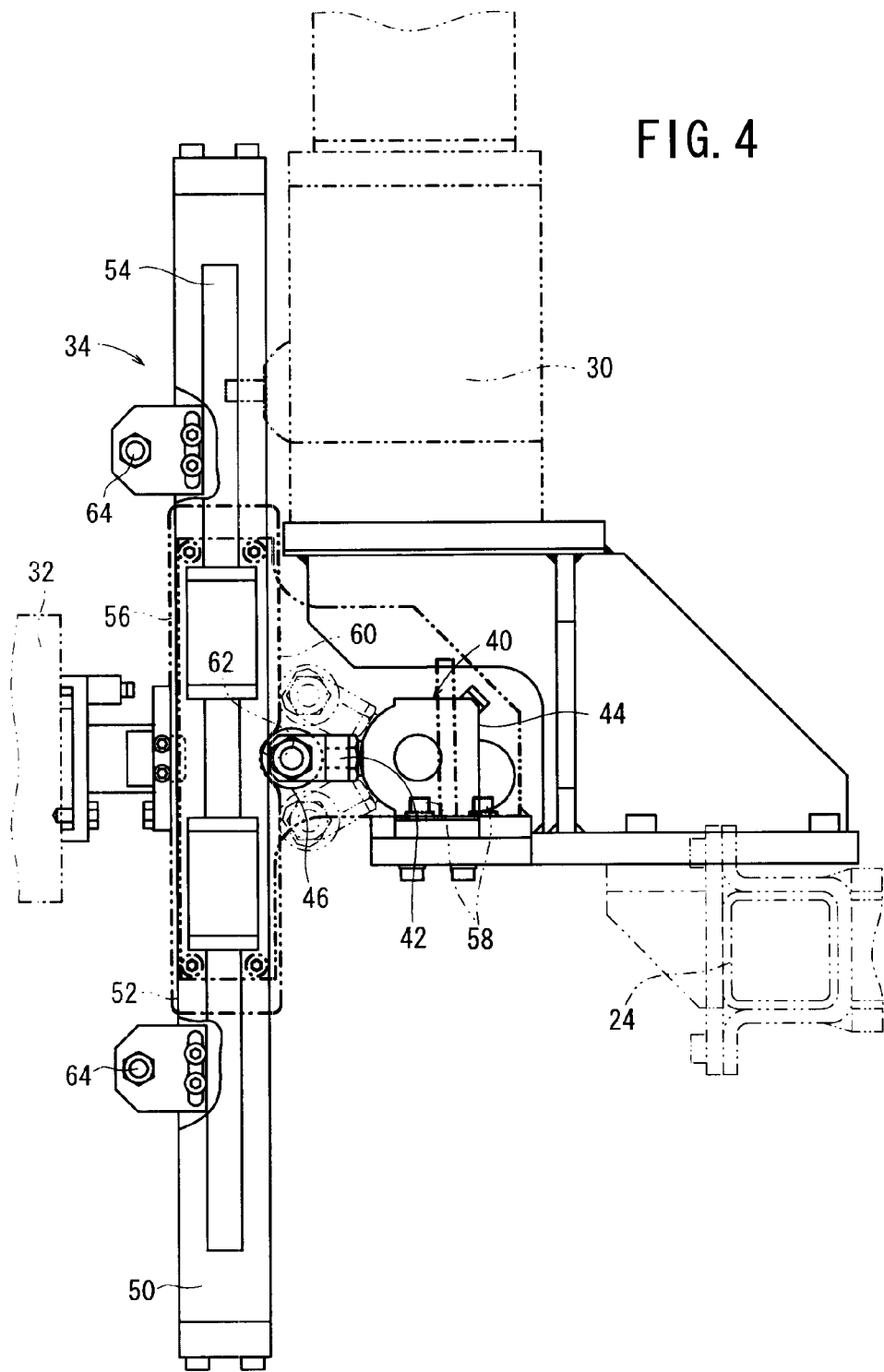
FIG. 4 is a side elevational view, partially cut away, of a joint and peripheral parts thereof, by which the balancer arm and the robot arm are joined to each other.
Figure 5:
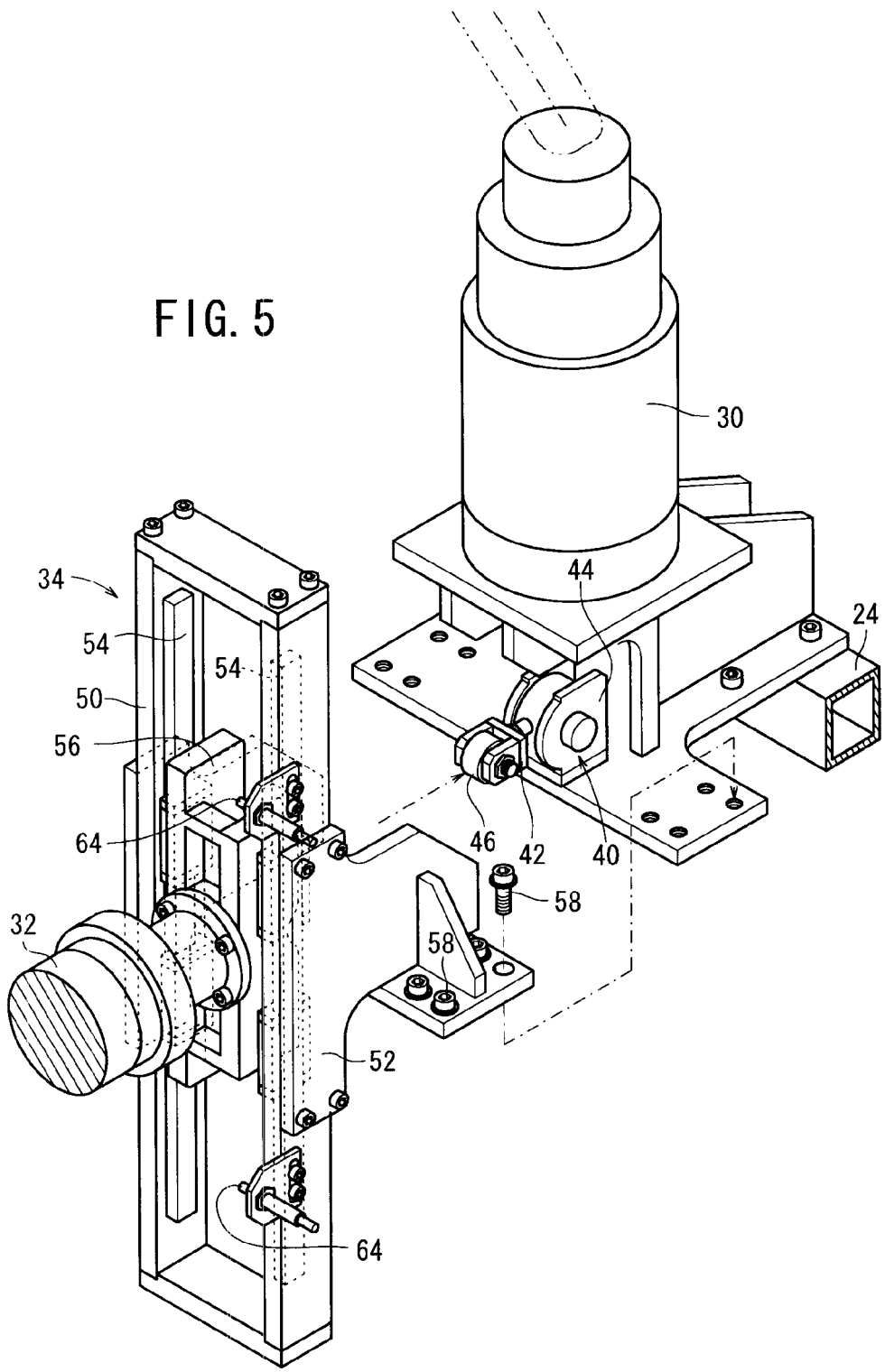
FIG. 5 is an exploded perspective view of the joint and peripheral parts thereof.
Figure 6:
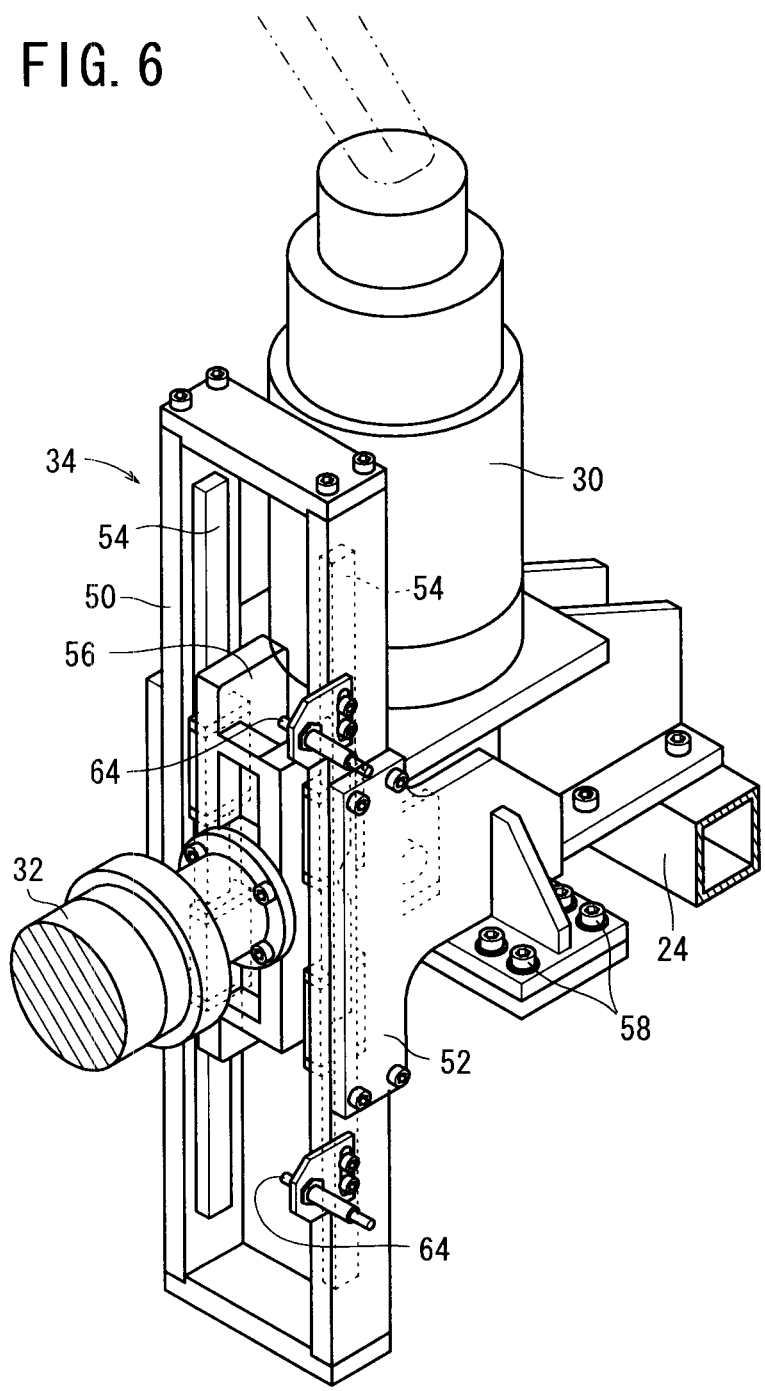
FIG. 6 is a perspective view of the joint and peripheral parts thereof.

FIG. 3 is a side elevational view showing the manner in which the balancer arm 30 and the robot arm 32 are joined to each other. FIG. 4 is a side elevational view, partially cut away, of the joint 34 and peripheral parts thereof. FIG. 5 is an exploded perspective view of the joint 34 and peripheral parts thereof. FIG. 6 is a perspective view of the joint 34 and peripheral parts thereof.

As shown in FIGS. 3 through 5, in the vicinity of the junction between the balancer arm 30 and the hand jig 24, a potentiometer unit 40 (hereinafter referred to as a "PM unit 40") is provided, including a rotary lever 42 (hereinafter referred to as a "lever 42") that is rotatable within a given angular range (e.g., −30° to +30°) in a hypothetical vertical plane, and a potentiometer 44 for detecting an angular displacement θ [degrees] of the lever 42. A roller 46 is mounted on the distal end of the lever 42. The hand jig 24 together with the workpiece 14 supported thereon can be lifted and lowered by externally operating the lever 42, in order to change the angular displacement θ thereof.

Figure 7:
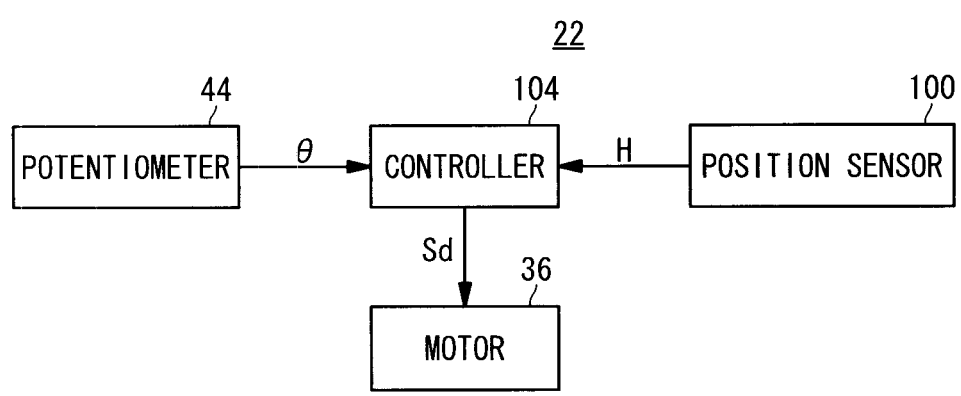
FIG. 7 is a block diagram showing a general arrangement for controlling a vertical drive force on a balancer according to the first embodiment.

FIG. 7 is a block diagram showing a general arrangement for controlling a vertical drive force on the balancer 22. As shown in FIG. 7, the balancer 22 includes a position sensor 100 and a controller 104, in addition to the motor 36 and the potentiometer 44.

The position sensor 100 is included in the balancer 22 for detecting a vertical positional coordinate (height H) of the balancer arm 30. The controller 104 controls the output of the motor 36 based on the angular displacement θ detected by the potentiometer 44, and the height H detected by the position sensor 100.

Figure 8:
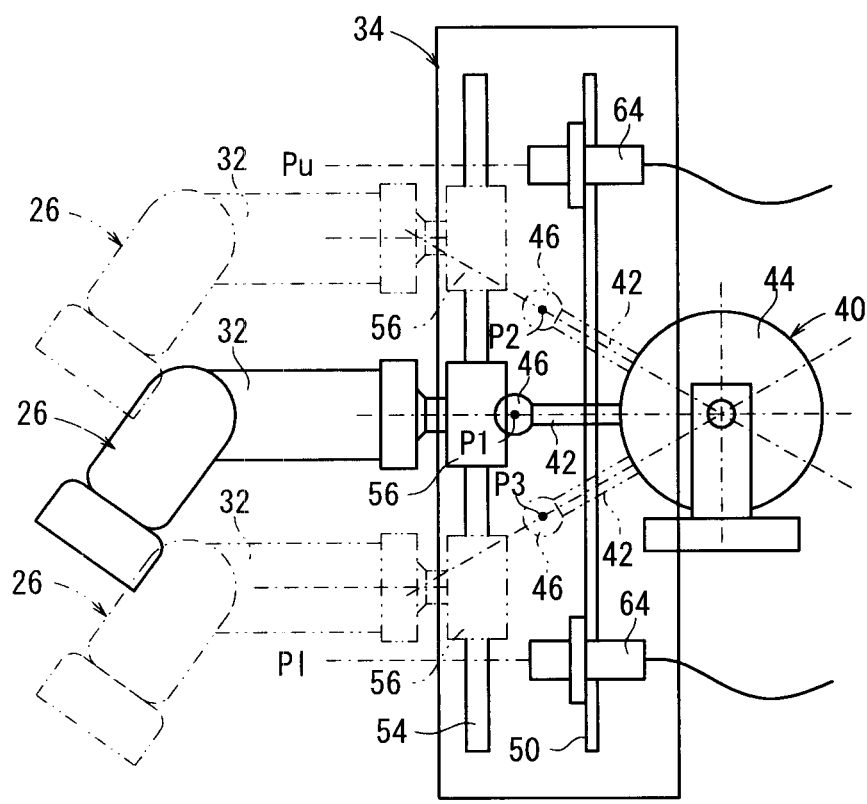
FIG. 8 is a schematic view showing a manner in which vertical movement of the balancer arm is controlled by the robot arm.

FIG. 8 is a schematic view showing a manner in which vertical movement of the balancer arm 30 is controlled by the robot arm 32. As shown in FIG. 8, when the lever 42 is in an initial position P1, the lever 42 is oriented horizontally and the angular displacement is nil. When the lever 42 is in the initial position P1, the balancer 22 does not move vertically, and the motor 36 operates to maintain the balancer arm 30 and the hand jig 24 at a constant height. When the lever 42 is rotated vertically upward and brought into the position P2, for example, the balancer 22 is moved upwardly by the motor 36, thereby displacing the balancer arm 30 and the hand jig 24 vertically upward. Conversely, when the lever 42 is rotated vertically downward and brought into the position P3, for example, the balancer 22 is moved downwardly by the motor 36, thereby displacing the balancer arm 30 and the hand jig 24 vertically downward.

According to the first embodiment, the robot 26 includes a controller 48 (FIGS. 2 and 3), in addition to the robot arm 32, whereby movement of the robot arm 32 is controlled based on commands from the controller 48. The robot arm 32 has a distal end joined to the balancer arm 30 by the joint 34. Therefore, the robot arm 32 can apply an external horizontal force to the balancer arm 30 via the joint 34, in order to operate the lever 42 of the balancer arm 30 based on vertical movements of the robot arm 32, as described in detail later. The robot arm 32 has joints incorporating motors (not shown) therein as drive sources, each having a maximum power of 80 W or smaller.

As shown in FIGS. 4 through 6, the joint 34 includes a frame member 50 having a substantially rectangular cross section, a joint member 52 that joins the frame member 50 and the balancer arm 30 to each other, two linear guides 54 vertically disposed on inner sides of the frame member 50, and a slider 56 sandwiched between the two linear guides 54 and joined in a fixed manner to the robot arm 32. When the robot arm 32 is moved vertically, the slider 56 is displaced vertically between and along the linear guides 54. At this time, the other members, including the frame member 50, the joint member 52, and the linear guide 54, are not displaced. The joint member 52 is fastened by a plurality of bolts 58 to the balancer arm 30.

As shown in FIG. 4, the slider 56 has a cam groove 62 defined in a surface 60 thereof, which faces away from the robot arm 32. The cam groove 62 and the roller 46 on the lever 42 are positioned such that, when the lever 42 is in the initial position P1, the roller 46 on the lever 42 enters into the cam groove 62. When the slider 56 is displaced upwardly by the rotor arm 32, the roller 46 moves out of the cam groove 62 and into contact with another portion of the surface 60 other than the cam groove 62. At this time, the lever 42 is rotated, whereupon the balancer arm 30 moves vertically.

As shown in FIGS. 4 through 6 and 8, two proximity sensors 64 are mounted on the frame member 50. The proximity sensors 64 are disposed respectively in an upper-limit position Pu and a lower-limit position Pl (see FIG. 8) of the slider 56. In FIG. 8, for illustrative purposes, the proximity sensors 64 are shown as being disposed in changed positions. The proximity sensors 64 send output signals to the controller 48 of the robot 26 via a communication line, not shown. When the slider 56 reaches the upper-limit position Pu or the lower-limit position Pl, the controller 48 stops the robot arm 32 from operating.

[Vertical Control of the Balancer Arm 30]

A process for controlling the height H of the balancer arm 30 according to the first embodiment will be described below. The height H of the balancer arm 30 is controlled by controlling the output of the motor 36.

Figure 9:
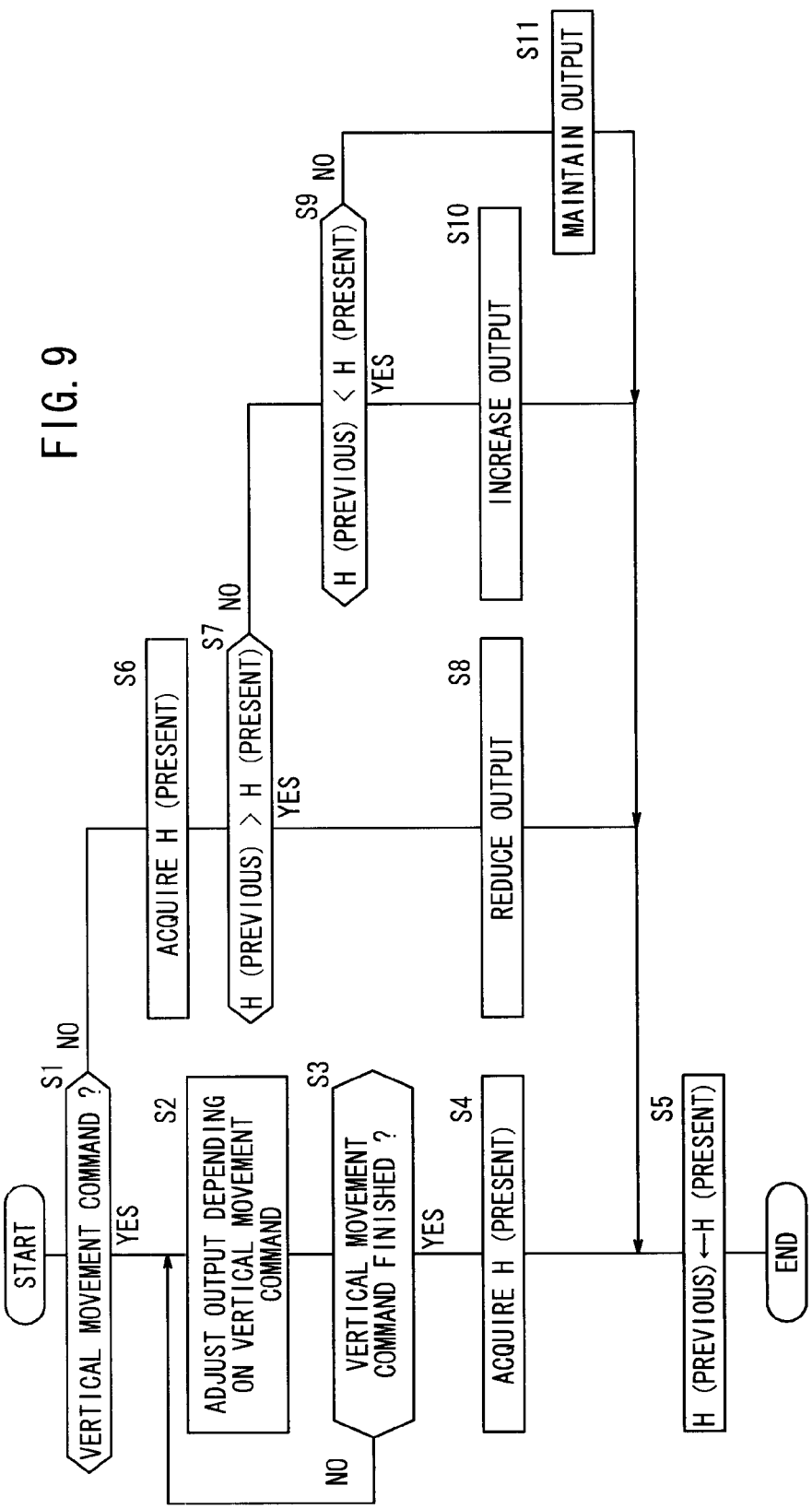
FIG. 9 is a flowchart of a sequence of a controller of the balancer, to control the output of a motor, according to the first embodiment.

FIG. 9 is a flowchart of a sequence of the controller 104 in order to control the output of the motor 36. In step S1, the controller 104 determines whether or not there is a vertical movement command for the PM unit 40, based on an angular displacement θ detected by the potentiometer 44. If the angular displacement θ is +30°, i.e., if the lever 42 is in position P2, then the controller 104 judges that a command has been made for lifting the balancer arm 30. If the angular displacement θ is −30°, i.e., if the lever 42 is in position P3, the controller 104 judges that a command has been made for lowering the balancer arm 30. In other words, when the angular displacement θ is of a positive value, the controller 104 lifts the balancer arm 30. The controller 104 can increase the output of the motor 36 as the angular displacement θ increases. Similarly, when the angular displacement θ is of a negative value, the controller 104 lowers the balancer arm 30. The controller 104 can reduce the output of the motor 36 as the absolute value of the angular displacement θ increases.

If there is a vertical movement command (S1: YES), then the controller 104 adjusts the output of the motor 36 depending on the vertical movement command. In the next step S3, the controller 104 determines whether or not the vertical movement command for the PM unit 40 has terminated, e.g., whether the angular displacement θ becomes nil.

If the vertical movement command is continued (S3: NO), then control returns to step S2. If the vertical movement command is terminated (S3: YES), then in step S4, the controller 104 acquires the height H from the position sensor 100. The acquired height H will be referred to as a "height H (present)" in order to distinguish the acquired height H from a previous height H that is used in the next cycle. A value to be used as a previous height H in a next cycle will be referred to as a "height H (previous)". In step S5, the controller 104 stores the height H (present) as the height H (previous) in a memory, not shown.

If there is no vertical movement command (S1: NO), then in step S6, the controller 104 acquires a height H (present) from the position sensor 100. If the present cycle is a first cycle and there is no height H (previous), then the controller 104 performs step S6 twice, and uses the first acquired height as the height H (previous) and the second acquired height as the height H (present).

In step S7, the controller 104 determines whether or not the height H (present) is greater than the height H (previous). If the height H (present) is greater than the height H (previous) (S7: YES), it is indicated that the balancer arm 30 is lifted. In step S8, the controller 104 reduces the output of the motor 36, thereby lowering the speed at which the balancer arm 30 is lifted in order to maintain the height H of the balancer arm 30. If the height H (present) is not greater than the height H (previous) (S7: NO), then control proceeds to step S9.

In step S9, the controller 104 determines whether or not the height H (present) is smaller than the height H (previous). If the height H (present) is smaller than the height H (previous) (S9: YES), then it is indicated that the balancer arm 30 is lowered. In step S10, the controller 104 increases the output of the motor 36, thereby lowering the speed at which the balancer arm 30 is lowered in order to maintain the height H of the balancer arm 30. If the height H (present) is not smaller than the height H (previous) (S9: NO), then in step S11, the controller 104 maintains the output of the motor 36.

After steps S8, S10, S11, similar to after step S4, then in step S5, the controller 104 stores the height H (present) as the height H (previous) in the non-illustrated memory.

The controller 104 repeats the sequence shown in FIG. 9 in fixed cyclic periods, each ranging from several microseconds to several hundred microseconds.

[Process for Moving the Workpiece 14]

A process for transferring a workpiece 14 onto the pallet jig 18 on the conveyor 20 using the workpiece feed apparatus 12 of the first embodiment will be described below.

Figure 10:
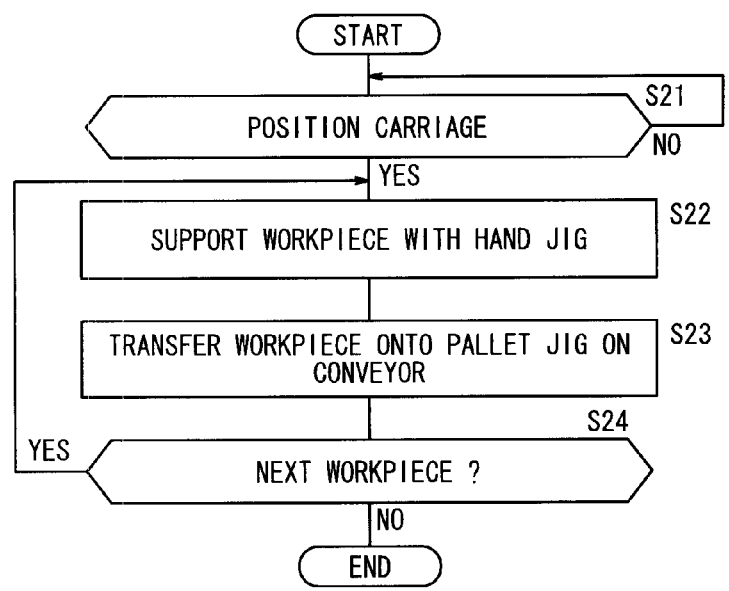
FIG. 10 is a flowchart of a sequence of the workpiece feed apparatus, to move a workpiece onto a pallet jig on a conveyor.

FIG. 10 is a flowchart of a sequence for the workpiece feed apparatus 12, in order to move a workpiece 14 onto the pallet jig 18 on the conveyor 20. In step S21, the controller 48 of the robot 26 determines, with a sensor (not shown), whether or not a carriage 16 has been positioned in a predetermined position Pc. The carriage 16 is positioned by an operator 70 (FIG. 1).

If the carriage 16 has not been positioned (S21: NO), then step S21 is repeated. If the carriage 16 has been positioned (S21: YES), then the controller 48 displaces the robot arm 32 while the balancer 22 is in operation, so as to cause the hand jig 24 to support a workpiece 14. At this time, another sensor (not shown) detects the position of the workpiece 14 to be moved. The controller 48 vertically moves the robot arm 32, which operates the PM unit 40, whereupon the balancer arm 30 is moved vertically in order to move the hand jig 24 vertically.

The controller 48 also horizontally moves the robot arm 32 in order to move the hand jig 24 horizontally. More specifically, when the robot arm 32 moves horizontally, the slider 56, which is fixed to the robot arm 32, also moves horizontally. When the slider 56 moves horizontally, a pressing force from the slider 56 is transmitted to the balancer arm 30 through at least one of the two linear guides 54, the frame member 50, and the joint member 52. As a result, the balancer arm 30 and the hand jig 24 are moved horizontally.

In step S23, the controller 48 controls the robot arm 32 in order to transfer the workpiece 14 onto the pallet jig 18 on the conveyor 20. Once transfer of the workpiece 14 is completed, the controller 48 controls the balancer arm 30 in order to return the hand jig 24 to the carriage 16, and in step S24, determines whether or not a next workpiece 14 exists. If a next workpiece 14 exists (S24: YES), then control returns to step S22. If a next workpiece 14 does not exist (S24: NO), then the present sequence is brought to an end. The controller 48 similarly repeats transfer of workpieces 14 from another carriage 16.

If the operator 70 (FIG. 1), rather than the robot 26, manually transfers the workpiece 14, in the event of some failure, then the operator removes the joint 34 from the balancer arm 30. More specifically, the operator 70 unfastens the bolts 58 so as to separate the joint 34 and the robot arm 32 from the balancer arm 30. Then, the operator 70 retracts the robot 26 along the slide rails 28 away from the working position. While the robot 26 is undergoing repairs, the operator 70 operates the lever 42 in order to transfer workpieces 14 onto the pallet jig 18.

[Advantages of the First Embodiment]

According to the first embodiment, as described above, the robot arm 32 is capable of controlling displacement of the balancer arm 30. Since operation of the robot arm 32 can be assisted by the balancer arm 30, the articulated robot 26 can be reduced in size and simplified in structure. Consequently, a desired operational sequence can be carried out efficiently by a simple and compact arrangement.

According to the first embodiment, the robot 26 has a maximum power of 80 W. Therefore, the robot 26 can meet standards (ISO-10218-1: Safety Requirements for Industrial Robots) of the International Organization for Standardization (ISO), or standards (JIS B8433-1: Industrial Robots—Safety Requirements—Part 1: Robots) of the Japan Industrial Standards (JIS).

According to the first embodiment, the joint 34 joins the robot arm 32 to the balancer arm 30 in a detachable manner. In other words, the robot arm 32 and the balancer arm 30 are capable of being separated from each other when the joint member 52 is detached from the balancer arm 30. If necessary, the robot arm 32 may be separated from the balancer arm 30, and the balancer arm 30 may be applied to a different mode of use (e.g., to assist an operation sequence carried out by the operator 70).

According to the first embodiment, the robot arm 32 controls vertical movement of the balancer arm 30 through the joint 34, which includes the linear guides 54 and the slider 56. Therefore, the balancer arm 30 and the robot arm 32 are joined to each other by a simple structure. Certain commercially available balancers include an operation switch having a rotary lever and a potentiometer. The joint 34 makes it possible to construct the workpiece feed apparatus 12 according to the present embodiment, while making use of a commercially available balancer and a commercially available articulated robot. Inasmuch as the balancer arm 30 is lifted when the rotary lever 42 is displaced upwardly, and since the balancer arm 30 is lowered when the rotary lever 42 is displaced downwardly, the robot arm 32 and the slider 56 can move vertically before the balancer arm 30 is displaced, and hence the robot arm 32 and the slider 56 can operate efficiently.

According to the first embodiment, the slider 56 includes the cam groove 62 defined therein for engaging the roller 46 on the rotary lever 42. When the rotary lever 42 is in a position (initial position P1) for stopping vertical movement of the balancer arm 30, the roller 46 enters into the cam groove 62. When the rotary lever 42 is in another position (e.g., position P2 or position P3) for lifting or lowering the balancer arm 30, the roller 46 is positioned outside of the cam groove 62. Therefore, the roller 46 is held stably in the initial position P1.

According to the first embodiment, the joint 34 includes the proximity sensors 64 for detecting the position of the slider 56, and the proximity sensors 64 are disposed in the upper-limit position Pu and the lower-limit position Pl, respectively, of the slider 56. The proximity sensors 64 make it possible to prevent the slider 56 from moving too far away from the rotary lever 42, so that the robot arm 32 can be displaced following the balancer arm 30.

B. Second Embodiment

[Arrangement of the Second Embodiment (Differences from the First Embodiment)]

Figure 11:
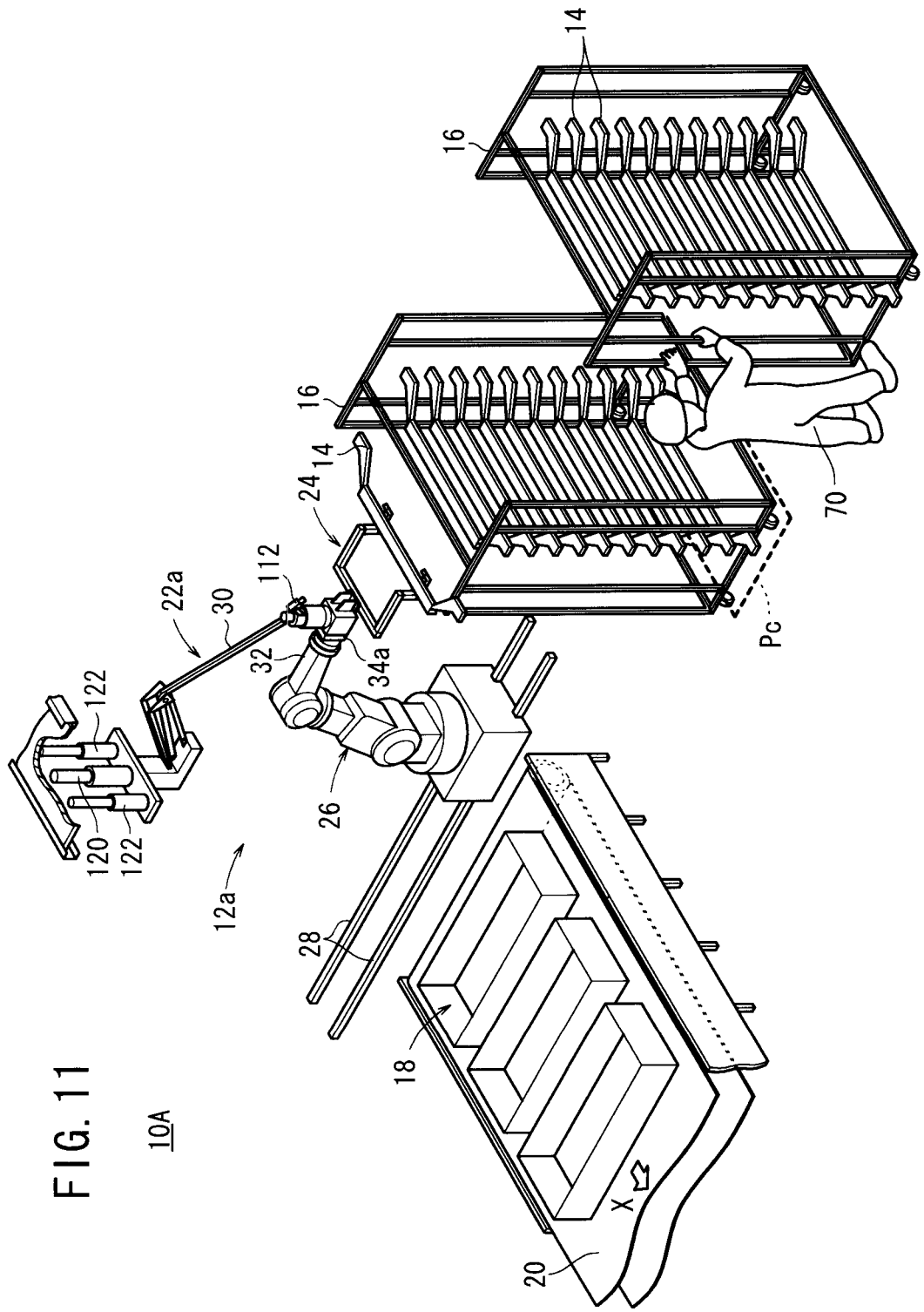
FIG. 11 is a perspective view of an assembly line incorporating a workpiece feed apparatus as a working apparatus according to a second embodiment of the present invention.
Figure 12:
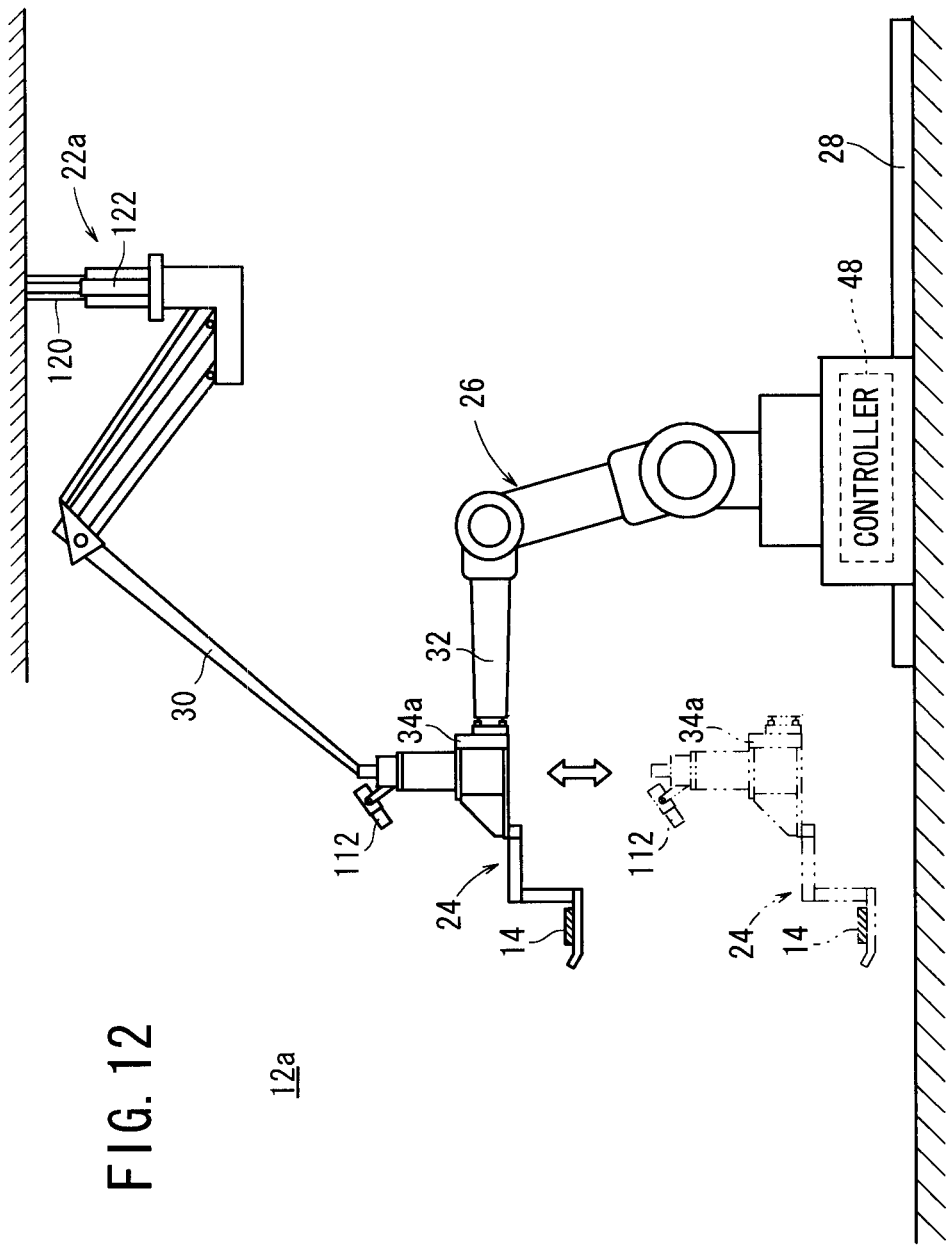
FIG. 12 is a side elevational view of the workpiece feed apparatus, which holds a workpiece, according to the second embodiment.

FIG. 11 is a perspective view of an assembly line 10A incorporating a workpiece feed apparatus 12a as a working apparatus according to a second embodiment of the present invention. FIG. 12 is a side elevational view of the workpiece feed apparatus 12a, which holds a workpiece 14.

The workpiece feed apparatus 12a according to the second embodiment basically has the same structure as the workpiece feed apparatus 12 according to the first embodiment. Components of the second embodiment, which are identical to those of the first embodiment, are denoted by identical reference characters, and such features will not be described in detail below.

Figure 13:
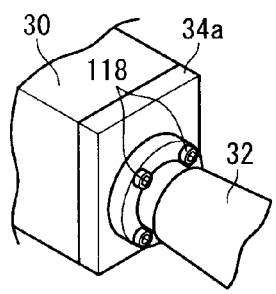
FIG. 13 is a fragmentary perspective view of a joint and peripheral parts thereof according to the second embodiment.

The second embodiment differs from the first embodiment as follows. According to the first embodiment, the robot arm 32 is relatively movable perpendicularly to the balancer arm 30 (see FIG. 8). According to the second embodiment, the robot arm 32 is fixed to the balancer arm 30 by a joint 34a. More specifically, as shown in FIG. 13, the distal end of the robot arm 32 is fastened by bolts 118 to the joint 34a. The joint 34a also is fastened to a distal end of the balancer arm 30 by bolts, not shown. Therefore, the balancer arm 30 is moved in any of various directions in unison with the robot arm 32. Stated otherwise, the balancer arm 30 according to the present embodiment bears the weight of the robot arm 32.

A balancer 22a according to the second embodiment includes an air cylinder 120 (drive device) and a vertical movement guide 122. However, the balancer 22a lacks the PM unit 40.

According to the second embodiment, a motor may be used instead of the air cylinder 120, or a combination of the air cylinder 120 and a motor, e.g., the combination disclosed in Japanese Laid-Open Patent Publication No. 2001-139300, may be used.

Figure 14:
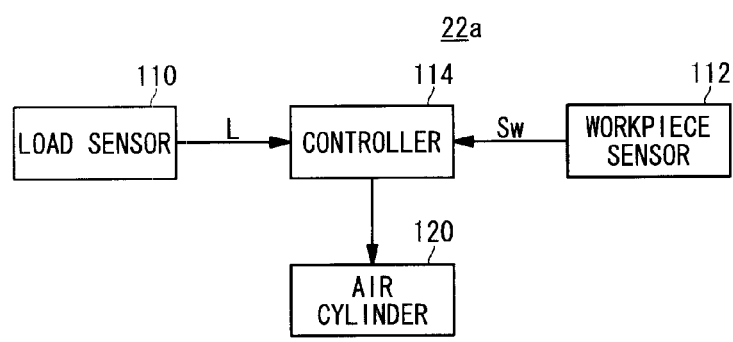
FIG. 14 is a block diagram showing a general arrangement for controlling a vertical drive force on a balancer according to the second embodiment.

FIG. 14 is a block diagram showing a general arrangement for controlling a vertical drive force on the balancer 22a. As shown in FIG. 14, the balancer 22a includes, in addition to the air cylinder 120, a load sensor 110, a workpiece sensor 112, and a controller 114.

The load sensor 110 is included in the balancer 22a for directly or indirectly detecting a load L [kg] applied to the balancer arm 30. More specifically, the load sensor 110 includes a pressure sensor for detecting the pressure applied to a piston (not shown) in the air cylinder 120, and the load sensor 110 outputs the detected pressure as indicative of the load L. If a motor is used instead of the air cylinder 120, or in combination with the air cylinder 120, a current sensor for detecting a torque of the motor can be used as the load sensor 110.

The workpiece sensor 112 comprises an image sensor, for example, disposed near a distal end of the balancer arm 30, which is capable of determining whether or not the balancer arm 30 currently supports the workpiece 14, as well as identifying the type of workpiece 14. The workpiece sensor 112 determines whether or not the balancer arm 30 supports the workpiece 14 by comparing relative positional coordinates of the workpiece 14 and the hand jig 24, for example. The workpiece sensor 112 identifies the type of workpiece 14 by extracting a profile of the workpiece 14, and determining whether or not the extracted profile agrees with a reference pattern. Alternatively, the workpiece sensor 112 may comprise any of various sensors, such as a proximity sensor, a pressure sensor, etc., rather than an image sensor. Alternatively, an IC tag may be applied to the workpiece 14, and a radio communication unit for reading information from the IC tag may be used as part of the workpiece sensor 112.

As with the first embodiment, the air cylinder 120 according to the second embodiment serves to apply a vertical drive force to the balancer arm 30, and may comprise an air cylinder as disclosed in Japanese Laid-Open Patent Publication No. 2001-139300, for example. The controller 114 controls the output of the air cylinder 120 based on the load L detected by the load sensor 110 and a workpiece signal Sw, which is indicative of information concerning the workpiece 14 detected by the workpiece sensor 112.

[Vertical Control of the Balancer Arm 30]

A process for controlling the height H of the balancer arm 30 according to the second embodiment will be described below. The height H is controlled by controlling the output of the air cylinder 120.

Figure 15:
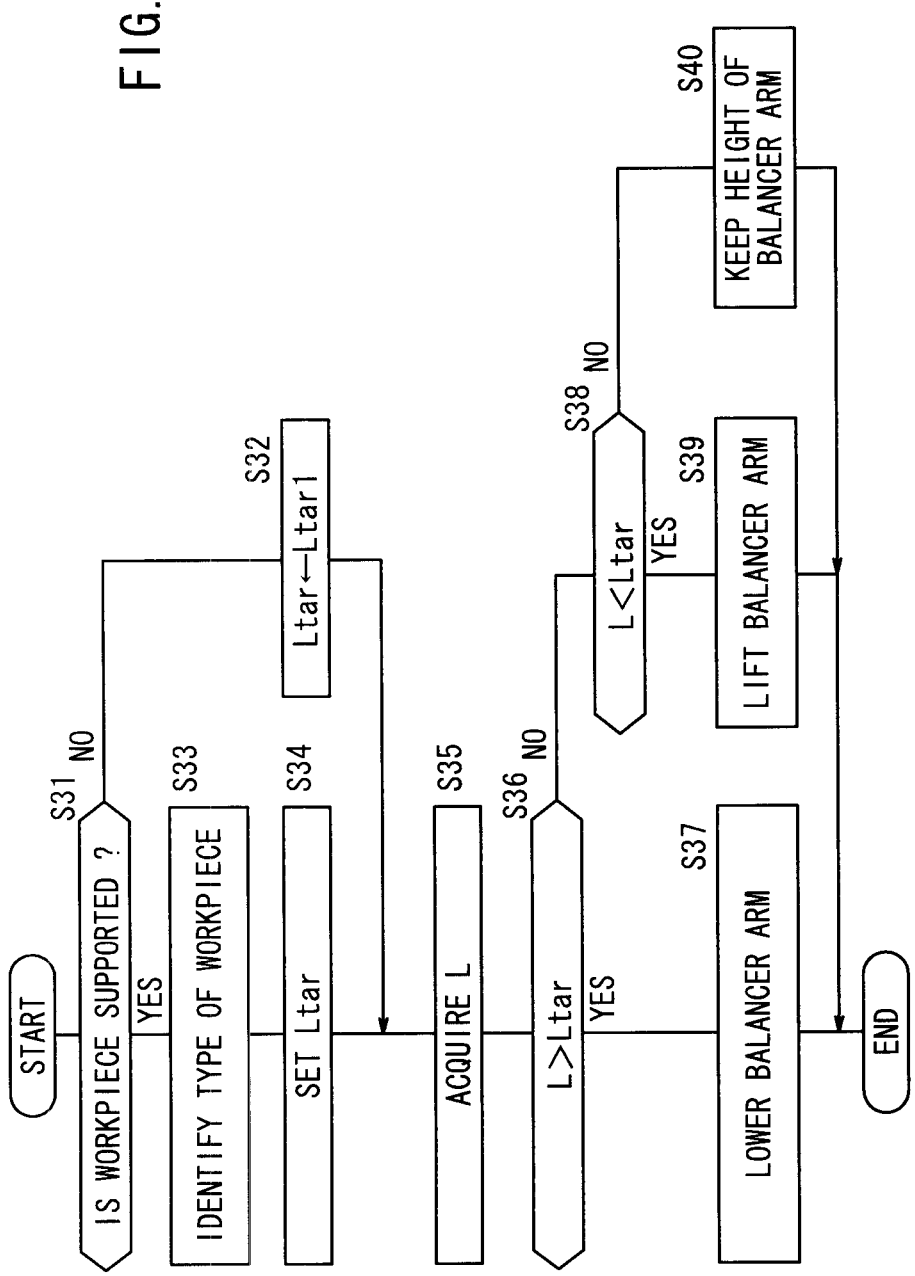
FIG. 15 is a flowchart of a sequence of a controller of a balancer, to control the output of an air cylinder, according to the second embodiment.

FIG. 15 is a flowchart of a sequence for the controller 114, in order to control the output of the air cylinder 120. In step S31, the controller 114 determines whether or not the balancer arm 30 is currently supporting the workpiece 14, based on the workpiece signal Sw from the workpiece sensor 112. If the balancer arm 30 is not supporting a workpiece 14 (S31: NO), then in step S32, the controller 114 sets a target value for the load L (target load Ltar) [kg] to an initial target value Ltar1 [kg]. The initial target value Ltar1 is established depending on the weight of the robot arm 32 while the robot arm 32 does not support the workpiece 14. When the air cylinder 120 generates a vertically upward drive force corresponding to the initial target value Ltar1, a vertical load is not imposed on the robot arm 32, and the robot arm 32 thus is capable of holding the vertical position, even if the output of the air cylinder 120 is small.

If the balancer arm 30 supports the workpiece 14 (S31: YES), then in step S33, the controller 114 identifies the type of workpiece 14 based on the workpiece signal Sw from the workpiece sensor 112. In the next step S34, the controller 114 sets a target load Ltar depending on the type of workpiece 14. The relationship between the type of workpiece 14 and the target load Ltar is stored in advance in a storage unit (not shown) of the controller 114.

Since the torque of a motor, or alternatively the pressure in the air cylinder, can be used as a quantity indicative of the load L, the target load Ltar can be controlled as a target value for torque or pressure.

In step S35, after step S32 or step S34, the controller 114 acquires the load L from the load sensor 110. In the following step S36, the controller 114 determines whether or not the load L is greater than the target load Ltar. If the load L is greater than the target load Ltar (S36: YES), then it is considered that the load from the robot 26 has increased as a result of descent of the robot arm 32. Stated otherwise, the fact that the robot 26 lowers the robot arm 32 implies that the balancer 22 has been instructed to lower the balancer arm 30. In step S37, the controller 114 lowers the vertically upward drive force produced by the air cylinder 120, thereby lowering the balancer arm 30. More specifically, the controller 114 reduces the pressure applied to the piston (not shown) in the air cylinder 120. If the load L is not greater than the target load Ltar (S36: NO), then control proceeds to step S38.

In step S38, the controller 114 determines whether or not the load L is smaller than the target load Ltar. If the load L is smaller than the target load Ltar (S38: YES), then it is considered that the robot 26 bears a portion of the load, as a result of ascent of the robot arm 32. Stated otherwise, the fact that the robot 26 lifts the robot arm 32 implies that the balancer 22 has been instructed to lift the balancer arm 30. In step S39, the controller 114 increases the output of the air cylinder 120. More specifically, the controller 114 increases the pressure applied to the piston (not shown) in the air cylinder 120. If a motor is used instead of or in addition to the air cylinder 120, then the controller 114 increases the torque of the motor.

If the load L is not smaller than the target load Ltar (S38: NO), then the load L is equal to the target load Ltar, and in step S40, the controller 114 maintains the height of the balancer arm 30. In other words, the controller 114 maintains the pressure applied to the piston (not shown) in the air cylinder 120. If a motor is used instead of or in addition to the air cylinder 120, then the controller 114 maintains the torque of the motor.

The controller 114 repeats the sequence shown in FIG. 15 in fixed cyclic periods, each ranging from several microseconds to several hundred microseconds, for example.

[Advantages of the Second Embodiment]

The second embodiment described above offers the following advantages, in addition to the advantages of the first embodiment. According to the second embodiment, since the weight of the robot arm 32 is borne by the balancer arm 30, the robot arm 32 is not required to bear its own vertical weight, and hence the output of the motor used for the robot arm 32 can be reduced (e.g., the robot 26 may have a maximum power or maximum rated output of 80 W or smaller). Therefore, the output of the robot 26 can be reduced, and as a result, the robot 26 can be used in an environment including operators.

C. Modifications

The present invention is not limited to the above embodiments, but various arrangements may be adopted based on the content of the present description. For example, the present invention may adopt the following alternative arrangements.

With the workpiece feed apparatus 12, 12a according to the above embodiments, the hand jig 24 is mounted on the distal end of the balancer arm 30 for feeding the workpiece 14. However, the hand jig 24 may be replaced with another jig for feeding another type of workpiece. Alternatively, an external device such as a processing device (e.g., nut runners for installing tires) may be mounted on the distal end of the robot arm 32 and supported by the balancer arm 30.

In the first embodiment, the robot arm 32 operates the PM unit 40 in order to control vertical movement of the balancer arm 30. In the second embodiment, vertical movement of the balancer arm 30 is controlled depending on the load L, which is indicative of vertical movement of the robot arm 32. However, the controller 48 of the robot 26 and the balancer 22, 22a may communicate with each other, whereby the controller 48 sends electric signals for instructing the balancer 22, 22a to move vertically, for thereby controlling vertical movement of the balancer arm 30.

In the above embodiments, the balancer 22, 22a is suspended from the ceiling. However, the balancer 22, 22a may be mounted on the floor or in another location.

In the above embodiments, the robot 26 has a maximum power of 80 W. However, the robot 26 may have a smaller maximum power, e.g., a maximum power equal to or greater than 50 W and smaller than 80 W. A robot 26 having such a maximum power is capable of satisfying ISO-10218-1 and JIS B8433-1 standards. Alternatively, the robot 26 may have a maximum rated output of 80 W or lower, e.g., a maximum rated output equal to or greater than 50 W and smaller than 80 W. A robot 26 having such a maximum rated output can be exempted from occupational safety and health regulations.

In the above embodiments, the balancer arm 30 and the robot arm 32 are joined to each other by the joint 34, 34a. However, the balancer arm 30 and the robot arm 32 need not necessarily be joined to each other, insofar as the balancer arm 30 is arranged to assist the robot arm 32.

In the above embodiments, the slider 56 is sandwiched between the two linear guides 54. However, the slider 56 may be guided by means of a single linear guide 54.

The invention claimed is:

1. A working apparatus comprising a balancer, an articulated robot, and a joint that physically joins a balancer arm of the balancer and a robot arm of the robot,
    wherein the balancer:
    supports a workpiece or an external device with the balancer arm;
    maintains the balancer arm at a constant height with an output depending on a weight of the workpiece or the external device;
    horizontally moves the balancer arm depending on a horizontal external force applied to the balancer arm; and has a vertical movement switch for externally controlling vertical movement of the balancer arm; and wherein the robot:

operates the vertical movement switch through the robot arm, so as to control vertical movement of the balancer arm; and applies a horizontal external force to the balancer arm through the robot arm and the joint, so as to move the balancer arm horizontally;

wherein the vertical movement switch of the balancer includes a rotary lever rotatable within a given angular range in a hypothetical vertical plane, and a potentiometer for detecting angular displacement of the rotary lever;

when the rotary lever is horizontal, vertical movement of the balancer arm is stopped, when the rotary lever is displaced upwardly, the balancer arm is lifted, and when the rotary lever is displaced downwardly, the balancer arm is lowered;

the joint includes a linear guide extending vertically and fixed to the balancer arm, and a slider movable reciprocally on the linear guide and fixed to the robot arm; and when the rotary lever is horizontal, the rotary lever has a distal end held in engagement with the slider, and the robot causes the slider to displace the rotary lever, so as to control vertical movement of the balancer.

2. The working apparatus according to claim 1, wherein the slider has a cam groove defined therein, which engages the distal end of the rotary lever; and when the rotary lever is in a position for stopping vertical movement of the balancer arm, the distal end of the rotary lever enters into the cam groove, and when the rotary lever is in a position for lifting or lowering the balancer arm, the distal end of the rotary lever moves out of the cam groove.

3. The working apparatus according to claim 1, wherein the joint includes a position sensor for detecting a position of the slider, the position sensor being disposed in at least one of an upper-limit position and a lower-limit position of the slider.

4. The working apparatus according to claim 1, wherein the joint includes a detachable member by which the robot arm is detachably joined to the balancer arm.

5. A working method using a working apparatus, which includes a balancer supporting a workpiece or an external device with a balancer arm, and an articulated robot having a robot arm, which is joined to the balancer arm by a joint, the working method comprising the steps of:

operating a vertical movement switch of the balancer with the robot arm, so as to vertically move the balancer arm while the workpiece or the external device is supported by the balancer arm; and applying a horizontal external force from the robot arm to the balancer arm through the joint, so as to move the balancer arm horizontally while the workpiece or the external device is supported by the balancer arm;

wherein the vertical movement switch of the balancer includes a rotary lever rotatable within a given angular range in a hypothetical vertical plane, and a potentiometer for detecting angular displacement of the rotary lever;

when the rotary lever is horizontal, vertical movement of the balancer arm is stopped, when the rotary lever is displaced upwardly, the balancer arm is lifted, and when the rotary lever is displaced downwardly, the balancer arm is lowered;

the joint includes a linear guide extending vertically and fixed to the balancer arm, and a slider movable reciprocally on the linear guide and fixed to the robot arm; and when the rotary lever is horizontal, the rotary lever has a distal end held in engagement with the slider, and the robot causes the slider to displace the rotary lever, so as to control vertical movement of the balancer.

* * * * *